T. WEAVER.
VEHICLE-WHEEL.

No. 179,671. Patented July 11, 1876.

Witnesses:
P. C. Dieterich
F. H. Duffy

Inventor:
Thomas Weaver
Per: C. H. Watson & Co., Attorneys.

UNITED STATES PATENT OFFICE.

THOMAS WEAVER, OF LILLARD'S MILLS, TENNESSEE.

IMPROVEMENT IN VEHICLE-WHEELS.

Specification forming part of Letters Patent No. 179,671, dated July 11, 1876; application filed May 3, 1876.

*To all whom it may concern:*

Be it known that I, THOMAS WEAVER, of Lillard's Mills, in the county of Marshall and State of Tennessee, have invented certain new and useful Improvements in Wagon-Wheels; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a wheel for wagons and other vehicles, as will be hereinafter more fully set forth.

Figure 1:
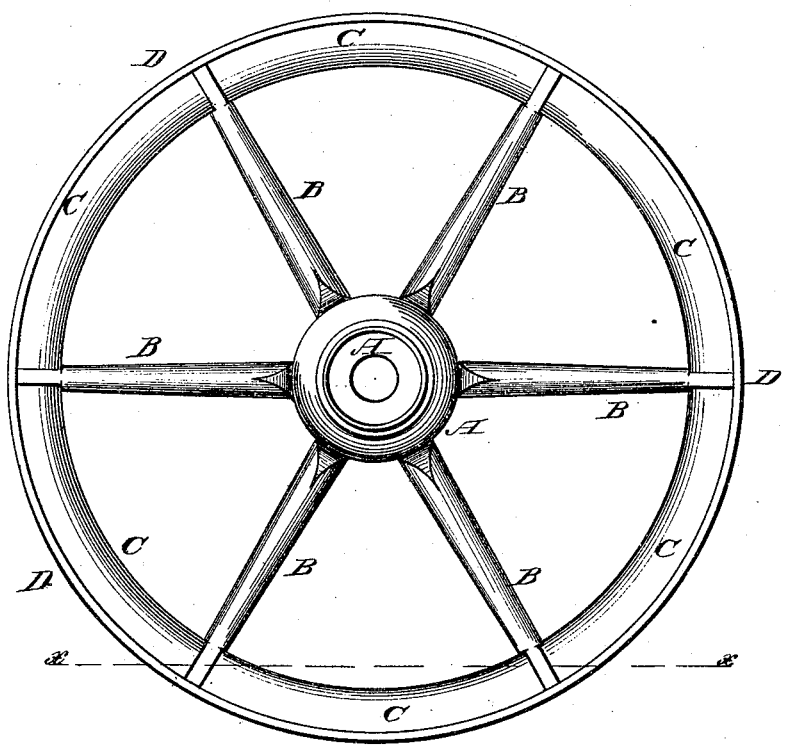
Figure 2:
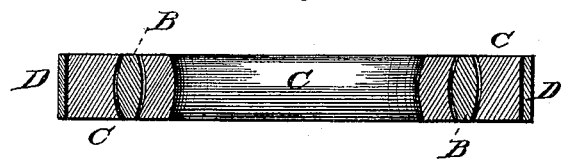
Figure 3:
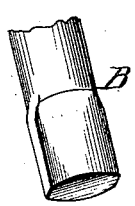
Figure 4:
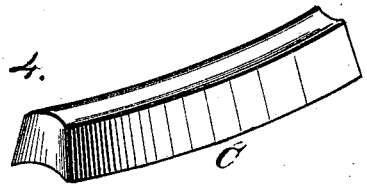

In the annexed drawing, Figure 1 is a front elevation of my wheel. Fig. 2 is a transverse section on line $x\,x$, Fig. 1; and Figs. 3 and 4 represent enlarged perspective views of the spoke and felly, respectively.

A represents the hub of the wheel, constructed in any of the known and usual ways, and from the same radiate a series of spokes, B B, fastened in the hub in any ordinary manner. The outer end of each spoke is made oval, as shown, and the ends of the fellies C C are formed with corresponding recesses, so as to fit around the oval ends of the spokes. After the wheel has been thus put together, with one felly between every two spokes, the tire D is shrunk around the wheel, which secures them all in position, and makes a cheap and durable wheel, not liable to get broken.

In ordinary wheels, where the spokes have tenons fitting in mortises in the fellies, the wheel always fails by the tenon breaking, the mortise-opening, or the felly splitting at the ends with the grain. These difficulties are entirely overcome by my invention.

The ends of the spokes may be made square or diamond-shaped, as well as oval, only so that the ends of the fellies fit around them.

Having thus fully described my invention, what I claim as new, and desire to secure by Letters Patent, is—

The combination of the hub A, spokes B, the fellies C, fitting between the spokes, and joining at the ends of the same, and the tire D, all substantially as and for the purposes herein set forth.

In testimony that I claim the foregoing as my own I affix my signature in presence of two witnesses.

THOMAS WEAVER.

Witnesses:
SAMUEL B. FRANK,
G. W. TARPLEY.